United States Patent
Flore et al.

(10) Patent No.: US 8,285,281 B2
(45) Date of Patent: Oct. 9, 2012

(54) METHODS AND APPARATUS FOR SELF CONFIGURING NETWORK RELATIONS

(75) Inventors: Oronzo Flore, Ostuni (IT); Lorenzo Casaccia, Rome (IT); Mungal Singh Dhanda, Slough (GB)

(73) Assignee: Qualcomm Incorporated, San Diego, CA (US)

( * ) Notice: Subject to any disclaimer, the term of this patent is extended or adjusted under 35 U.S.C. 154(b) by 519 days.

(21) Appl. No.: 12/259,126

(22) Filed: Oct. 27, 2008

(65) Prior Publication Data

US 2009/0191866 A1 Jul. 30, 2009

Related U.S. Application Data

(60) Provisional application No. 60/983,533, filed on Oct. 29, 2007.

(51) Int. Cl.
*H04W 4/00* (2009.01)
(52) U.S. Cl. .................. 455/434; 455/432.1; 455/422.1
(58) Field of Classification Search .................. 455/434, 455/432.1, 422.1
See application file for complete search history.

(56) References Cited

U.S. PATENT DOCUMENTS

| | | | |
|---|---|---|---|
| 6,192,244 B1 | 2/2001 | Abbadessa | |
| 6,195,552 B1 | 2/2001 | Jeong et al. | |
| 7,359,362 B2 * | 4/2008 | King et al. | 370/338 |
| 2003/0186679 A1 | 10/2003 | Challener et al. | |
| 2004/0003285 A1 | 1/2004 | Whelan et al. | |
| 2005/0128988 A1 * | 6/2005 | Simpson et al. | 370/338 |
| 2005/0148368 A1 * | 7/2005 | Scheinert et al. | 455/561 |
| 2007/0140163 A1 | 6/2007 | Meier et al. | |
| 2009/0047945 A1 * | 2/2009 | Zhang et al. | 455/424 |
| 2009/0080381 A1 * | 3/2009 | Yashar et al. | 370/331 |
| 2009/0238157 A1 * | 9/2009 | Poyhonen et al. | 370/338 |

FOREIGN PATENT DOCUMENTS

| | | |
|---|---|---|
| EP | 1763178 A2 | 3/2007 |
| GB | 2425439 | 10/2006 |
| RU | 2161869 C1 | 1/2001 |
| WO | WO9917571 A1 | 4/1999 |

OTHER PUBLICATIONS

International Search Report & Written Opinion—PCT/US2008/081428, International Search Authority—European Patent Office—Mar. 18, 2009.
European Search Report—EP11153320—Search Authority—The Hague—Mar. 15, 2010.
Taiwan Search Report—TW097141630—TIPO—Feb. 20, 2012.

* cited by examiner

*Primary Examiner* — Ajit Patel

(57) ABSTRACT

Systems and methods that enable a network to configure its neighbor relation (e.g., automatically) by commanding each user equipment (UE) to scan its respective area for neighbor base stations on a predetermined frequency or radio access technology. Moreover, the network can compile lists (e.g., whitelists that identify base stations associated with the network, and black lists that indicate base stations associated with foreign networks) and advise the UEs accordingly (e.g., regarding possibilities for availability of base stations.) The network can therefore configure its neighbor relations automatically and with a higher precision as compared to manual configurations.

31 Claims, 11 Drawing Sheets

METHODS AND APPARATUS FOR SELF CONFIGURING NETWORK RELATIONS

The present application for patent claims priority to Provisional Application No. 60/983,533 entitled "INTER-RAT/ FREQUENCY AUTOMATIC NEIGHBOUR RELATION FUNCTION IN COMMUNICATION SYSTEMS" filed on Oct. 29, 2007 and assigned to the assignee hereof and hereby expressly incorporated by reference herein.

BACKGROUND

I. Field

The following description relates generally to wireless communications, and more particularly to self configuring a network via scanning for available base stations by mobile units.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into Ns independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems often times employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Wireless network market deployments generally include multiple carriers (or networks) and roaming agreements between carriers, referred to as roaming partners. Each carrier usually desires that the mobile device, which has subscribed to that carrier's service (referred to as a home network) perform functions or calls (e.g., data transfer, communication, and so forth) on the home network as long as possible. In general, when the mobile device is moving out of the coverage of the home network, or for some other reason cannot obtain home network coverage, the mobile device should transfer to a roaming partner's coverage.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with enabling a network to configure its neighbor relation (e.g., automatically) by commanding each user equipment (UE) to scan its respective area for neighbor base station(s) on a predetermined frequency or radio access technology. The information obtained from plurality of user equipment allows the network to construct a depiction of available base stations (e.g., associated with the network and/or foreign thereto), and based thereon the network can require collection of further details about base stations thus identified. Moreover, the network can compile lists (e.g., whitelists that identify base stations associated with the network; and/or black lists that indicate base stations associated with foreign networks)— and advise the UEs accordingly regarding potential possibilities of available base stations. Hence, a requirement for manual configuration of neighbor relations on a network can be mitigated (e.g., network installers determining available neighboring cell), since the network can configure its neighbor relations automatically and with a higher precision as compared to manual configurations.

In a related methodology, upon triggering of a predetermined event (e.g., at a predetermined time, addition of a base station to the network, and the like) UEs can automatically scan, for example, for the eNode Bs (i.e., Universal Mobile Telecommunications System (UMTS) base stations), and report such eNode Bs that are located in their respective areas to the network (e.g., identifying eNode Bs in vicinity that falls within scanning capabilities). The network can subsequently identify an eNode B that is associated with its network, and also an eNode B that is not associated therewith (e.g., being associated with foreign networks or foreign operators). Subsequently, the network can then supply UEs with a black list that indicate eNode Bs that such UEs should not interact with, and/or a white list that identifies a list of eNode Bs that the UEs are permitted and/or encouraged to interact with.

Another aspect relates to a wireless communication apparatus. The wireless communications apparatus can include at least one processor configured to command UEs to scan a neighborhood thereof for identifiable base stations. The at least one processor can further be configured to analyze information acquired by the UEs and automatically self configure neighbor relations for the network based thereon. Moreover, the at least one processor can further provide recommendations for interaction with the identified base stations (e.g., recommending and/or excluding a base station for interaction with the UEs.)

Still another aspect relates to a computer program product, which can have a computer-readable medium having a code for causing at least one computer to instruct a UE to scan vicinity thereof for identifiable base stations on a predetermined frequency or radio access technology. Such code can further cause an automatic configuration of the network based on base stations identified by the UEs.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
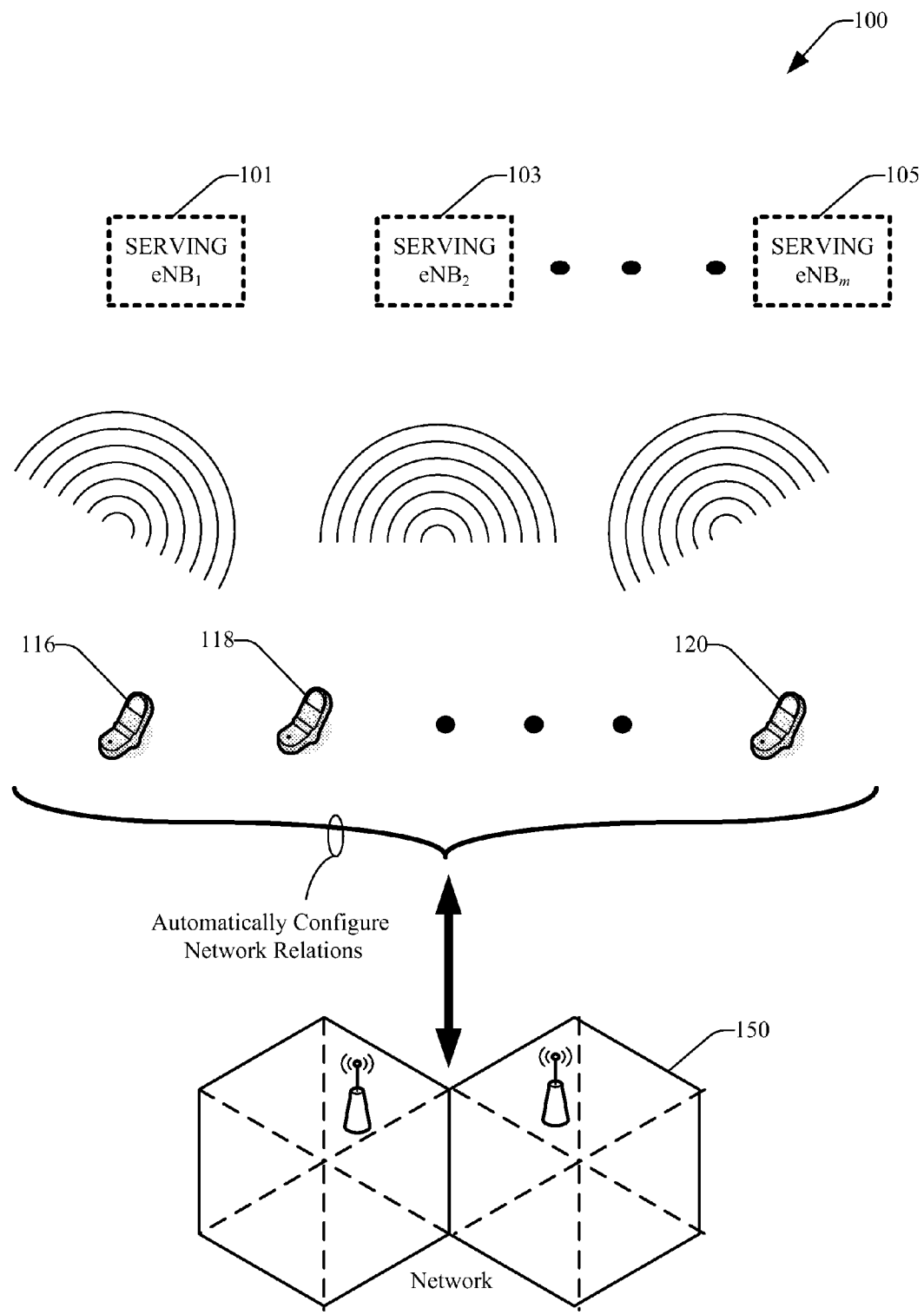
FIG. 1 is a block diagram illustrating an example search for base stations through one or more UEs according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to, hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an exemplary block diagram 100 for identifying base stations and self configuring neighbor relations a network 150 according to an aspect. The system 100 provides a framework that enables the network to configure itself (e.g., automatically) by commanding each user equipment (UE) 116, 118, 120 to scan their respective area for a base stations 101, 103, 105 (1 to m, m an integer) on a predetermined frequency. The scanning can occur based on a predetermined event such as addition of a new base station to the network, when quality of serving cell falls below a threshold value, or at predetermined time. When any of the UEs 116, 118, 120 enters such state of scanning, the UE can engage in continuous measurement for locating identifiable base stations within a scanning area thereof. The UE can initiate such scan and/or search for base stations based on a predetermined event and/or periodically, continuously, or sporadically search for all base stations available in every direction or sectors relative to UEs 116, 118, 120.

In one aspect, the UE can form a receiving directional beam of a given beamwidth in any direction in azimuth and elevation. For example, the UE can form directional beams covering a plurality of sectors; and selects the sector/beam from which it receives the highest Signal to Interference plus Noise (SINR) ratio with which to communicate. Moreover, beams can be formed by configuring the directional antenna to create beams in any desired direction. In addition, directional beams can be scanned one beam at a time to obtain the relative direction and/or signal strength of the base stations detected.

According to a further aspect, as part of the wireless network communication system, base stations 101, 103, 105 can periodically broadcast a beacon or pilot signal (e.g., Pilot A, Pilot B, Pilot C, and Pilot D) to notify others of their presence. As such, the UE can keep track of which base stations it finds at each beam position or sector. The pilot signals can also be employed to determine the signal strength or SINR at each sector scanned by the UE. Such SINR can be measured across all sectors or beam positions and the sectors or beam positions are ranked based on the SINR values. For example, the detected base stations 101, 103, 105 can further be ranked according to their signal strength.

According to a related aspect, searching for and synchronizing to a desired base station can be facilitated when any of the UEs 116, 118, 120 or mobile devices receive and/or detect respective Primary Synchronization Channels (PSCs) and/or Secondary Synchronization Channels (SSCs) from respective base stations 101, 103, 105. For example, UEs 116, 118, 120 can detect, analyze, and/or otherwise evaluate the received PSCs and SSCs to facilitate identifying and/or selecting a desired base station 101, 103, 105 in order to locate and/or enable subsequent communications with such base station 102. The PSC from base stations can be a known signal with respect to the UE mobile device, and there can be a common PSC, or a relatively small number of PSCs, related to the base stations in a network. The PSC can also provide the mobile device with timing information that can be utilized to facilitate synchronization for any of the mobile devices 116, 118, 120 with a base station 102, should a communication becomes necessary. SSCs can be unique to respective base stations 102, and can facilitate identifying a particular base station 101, 103, 105 (e.g., the SSCs can include base station identification information, antenna information associated with a base station, and the like), where there can be a plurality of different SSCs. As such, the information obtained from plurality of UEs 116, 118, 120 allows the network to construct a depiction of available base stations (e.g., associated with the network and/or foreign thereto), and further self configure itself.

Figure 2:
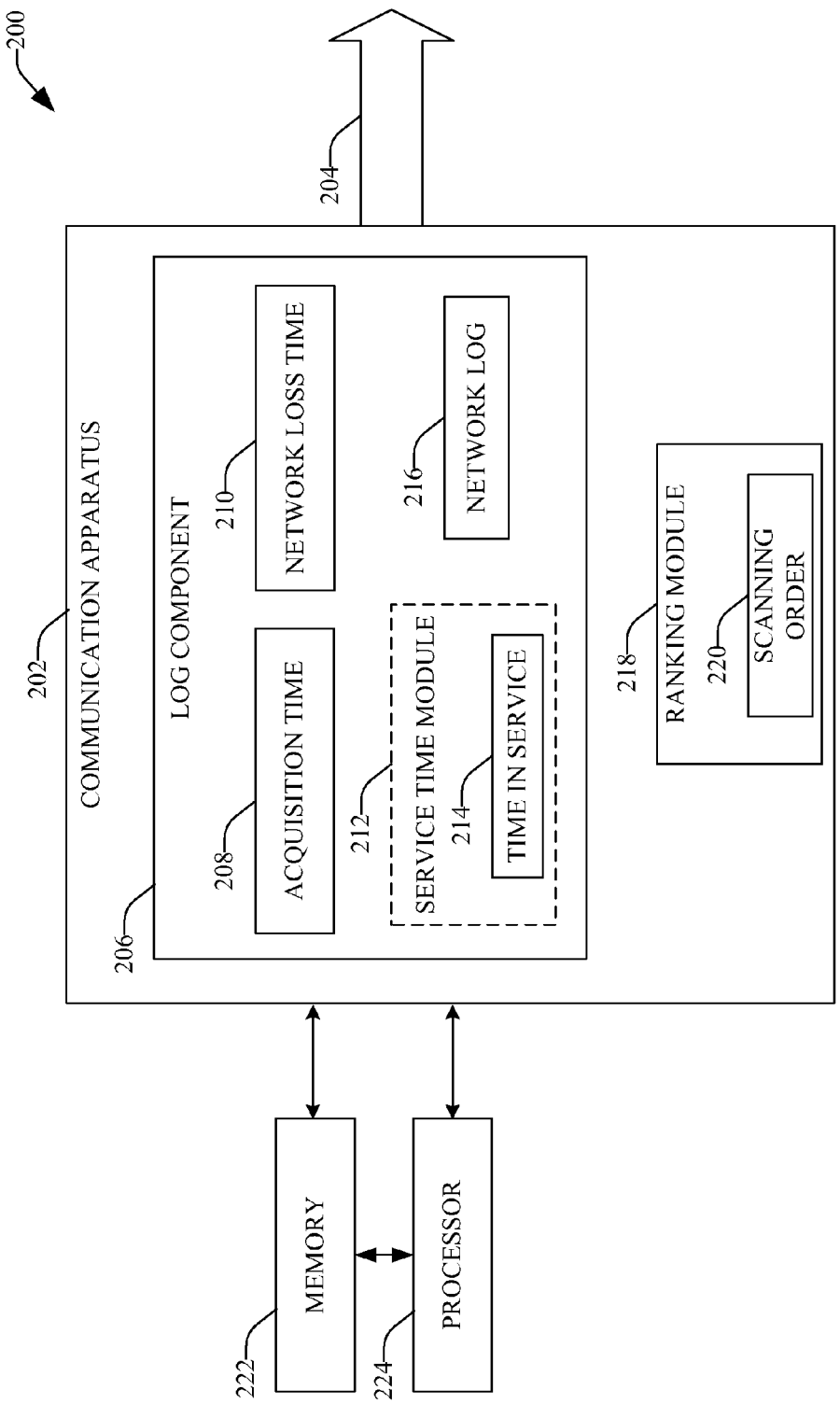
FIG. 2 is a block diagram illustrating an example system to scan channels on predetermined frequencies based on a request from the network according to an additional aspect.

FIG. 2 illustrates a system 200 that is configured to scan channels on predetermined frequencies based on a request from the network according to an aspect. System 200 includes a communication apparatus 202 that is shown to be transmitting data through a channel 204. Although depicted as transmitting data, communication apparatus 202 can also receive data through the channel 204 (e.g., communication apparatus 202 can concurrently transmit and receive data, communication apparatus 202 can transmit and receive data at different times, or combinations thereof). Communication apparatus 202, for example, can be a user equipment, mobile device or an access terminal or the like.

As illustrated in FIG. 2, the communication apparatus 202 can further include a log component 206 that can retain information related to networks with which communication apparatus 202 has achieved connectivity (e.g., communication, data transfer, and so on). According to an aspect, the log component 206 can extend the scope of information to cover an extended period of time (as opposed to merely last channel logged thereon). Based on such extended time period, a determination can be made as to how much time has been spent on various networks (preferred networks, less-preferred networks, home networks, roaming networks). By reviewing such historical data, a more refined estimate can be made regarding the presence of available base stations in a vicinity thereof.

The log component 206 can maintain information related to the history of the networks communication apparatus 202, which has been acquired over a target time period. This information can relate to the time of network acquisition 208 and the time of network loss 210. Based on the time of acquisition 208 and the time of loss 210, a service time module 212 can be configured (based on the two timestamps 208 and 210) to calculate a time in service 214 for each of the different networks acquired and/or identified, if more than one network has been acquired or located during the target time period. Although service time module 212 is illustrated as included in log component 206, it should be understood that service time module 212 can be a separate module.

As a function of the time in service 214, a network log can be developed that includes information related to the networks that communication apparatus 202 has employed during the target time period, for a subsequent identification thereof. The network listing can also include information related to whether the networks are preferred, or less preferable, networks. The information retained by network log 216 can be retained for the last n channels, n an integer. Further, the number of channels retained can be a predefined number or can be configured by a user, a service provider, a trusted third party, or combinations thereof and/or can be automatically configured by communication apparatus 202.

Based, in part, on the network log 216, a ranking module 218 can determine a scanning order 220 available in a neighborhood of the communication apparatus 202. In accordance with some aspects, ranking module 218 can maintain a table (list, chart, etc.) corresponding to a preferred scanning order 220. System 200 can include memory 222 operatively coupled to communication apparatus 202. Memory 222 can be external to communication apparatus 202 or can reside within communication apparatus 202. Memory 222 can store information related to facilitating a scan of the base stations and an identification thereof base stations, determining a time in service for a mobile device, developing a network log based on the time in service determination, and creating a channel ranking order based, in part, on the time in service determination, and other suitable information related to signals transmitted and received in a communication network. A processor 224 can be operatively connected to communication apparatus 202 (and/or memory 222) to facilitate analysis of information related to channel scanning in a communication network. Processor 224 can be a processor dedicated to analyzing and/or generating information received by communication apparatus 202, a processor that controls one or more components of system 200, and/or a processor that both analyzes and generates information received by communication apparatus 202 and controls one or more components of system 200.

Memory 222 can store protocols associated with channel scanning, taking action to control communication between communication apparatus 202 and other devices or nodes such that system 200 can employ stored protocols and/or algorithms to achieve improved communications in a wireless network as described herein.

Figure 3:
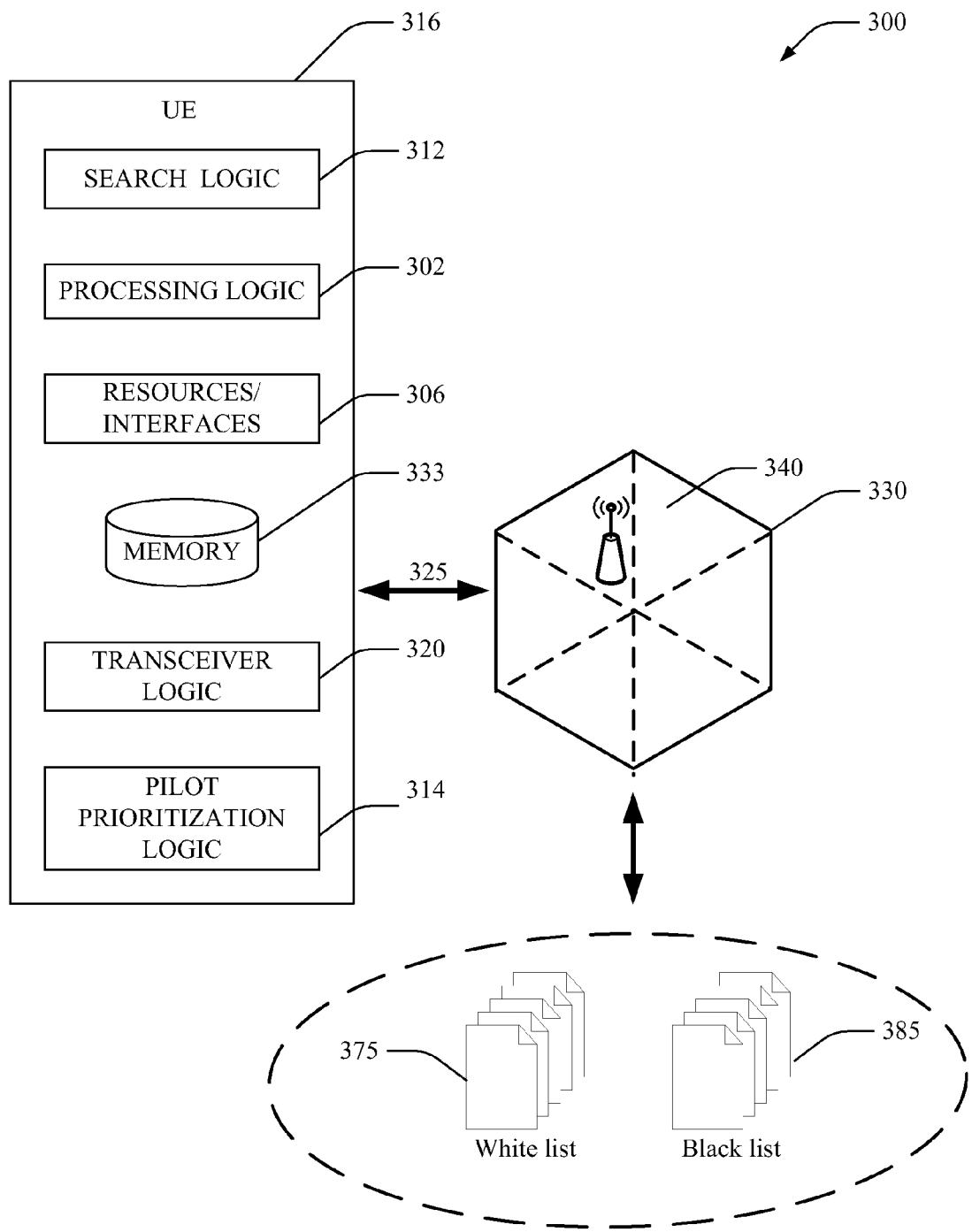
FIG. 3 is a block diagram illustrating an example system to facilitate self configuration of neighbor relations for a network according to other aspects.

FIG. 3 is a block diagram illustrating an example system 300 to facilitate self configuration of neighbor relations for a network according to other aspects. As shown, a device 316 includes a pilot search system for efficiently scanning or searching pilot signals in a wireless network. The device 316 can include processing logic module 302, memory module 333, device resources and interfaces 306, and a transceiver logic module 320, any or all of which modules coupled to a data bus (not shown). The device 316 also includes a search logic module 312 and pilot prioritization logic module 314 that can be coupled to the data bus. For example, the processing logic module 302 can include a CPU, processor, gate array, hardware logic, memory elements, virtual machine, software, and/or any combination of hardware and software. Thus, the processing logic module 302 generally includes logic capability to execute machine-readable instructions and to control one or more other functional elements of the device 316 via, for example, the aforementioned data bus.

Based on acquired information, the network can require that further details about base stations thus identified be collected. The network can also compile lists, such as whitelists 375 identifying base stations associated with the network and black lists 385 indicating base stations associated with foreign networks, and advise UEs accordingly in regard to potential possibilities for availability of base stations. Hence, a requirement for manual configuration of the neighbor relation for a network can be mitigated (e.g., network installers determining available neighboring cell), since the network 330 can configure neighbor configurations automatically and with a higher precision as compared to manual configurations. Further, the device resources and interfaces 306 comprise hardware and/or software that allow the device 300 to communicate with internal and external systems. For example, internal systems can include mass storage systems, memory, display drivers, modems, and other internal device resources. The external systems can include user interface devices, printers, disk drives, and other local devices or systems.

Likewise, the transceiver logic module 320 can include hardware and/or software that operates to allow the device 316 to transmit and receive data and other information with an external communication network or system. For example, the transceiver logic module 320 includes a communication link 325 that allows the transceiver logic to transmit and receive data and/or other information over a wireless communication network 340. For example, in one aspect, the transceiver logic module 320 operates to receive one or more pilot signals that have been transmitted from one or more base stations. The received pilot signals are used to identify base stations through which communications with a wireless network will occur. Thus, the device 316 is able to communicate with other network entities, such as remote base stations, terminals, devices or any other type of network entity.

The search logic module 312 can include a CPU, processor, gate array, hardware logic, memory elements, virtual machine, software, and/or any combination of hardware and software. The search logic module 312 generally provides logic to search for pilot signals in a communication network. In one aspect, the search logic 312 operates to search for one pilot at a time, and in another aspect, the search logic 312 operates to search for multiple pilot signals simultaneously.

The memory module 333 includes any type of memory suitable for storing information at the device 316. For example, in one aspect, the memory module 333 is used to store a neighbor list and window parameters that are received by the transceiver logic module 320. For example, a neighbor list can represent a list of pilot signals that are being transmitted by base stations in the area. The window parameters can be one or more parameters that are transmitted by one or more base stations as part of network information parameters, which are used by devices to access the wireless communication network 340. For example, window parameters 330 can indicate a window size that should be used to search for selected pilot signals.

The pilot prioritization logic module 314 can include a CPU, processor, gate array, hardware logic, memory elements, virtual machine, software, and/or any combination hardware and software. The pilot prioritization logic module 314 operates to allow the device 316 to efficiently search pilot signals from the neighbor list so that the device 316 can communicate with a wireless network without service interruptions. For example, the pilot prioritization logic module 314 can operate to organize the pilots in the neighbor list into a pilot list that can include old pilots, strong pilots, reacquisition pilots, and other pilot-related data. It will be appreciated that the data store (e.g., memories) modules described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 4:
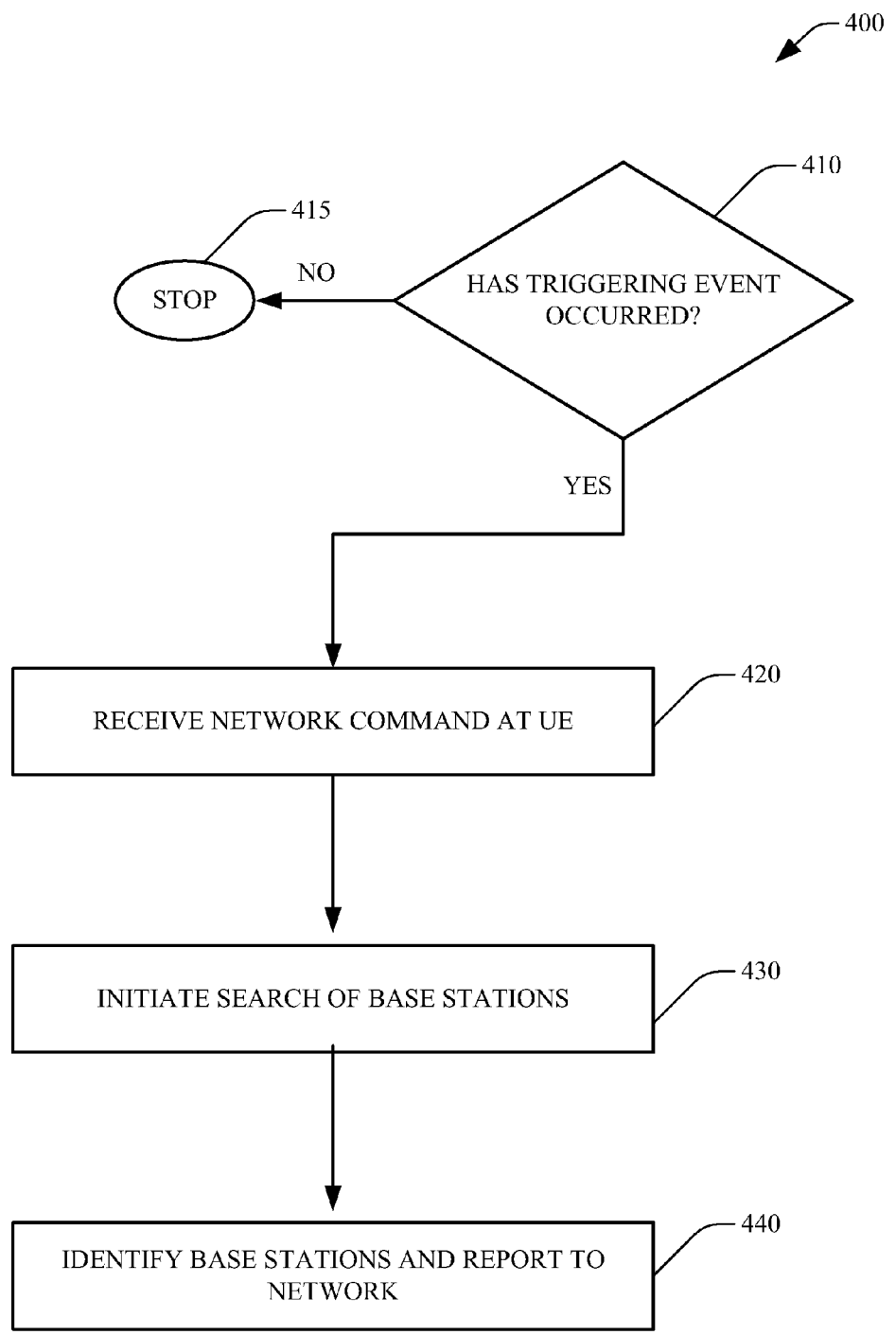
FIG. 4 is a flowchart illustrating a methodology of identifying a base station according to one aspect.

FIG. 4 illustrates a related methodology 400 that facilitates self configuring neighbor relations of a network according to an embodiment of the present invention. While the example method is described herein as a series of blocks representing various events and/or acts, embodiments of the present invention are not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the subject innovation. Moreover, it will be appreciated that the exemplary method and other methods according to the invention may be implemented in association with the method illustrated and described herein, as well as in association with other systems and apparatus not illustrated or described. At 410, a determination is made to verify the occurrence of a triggering event. Such a triggering event can include, for example, addition of a base station to the network, though other triggering events are contemplated by embodiments of the present invention. If not, the methodology halts at 415. Otherwise, the methodology issues a command at 420 by the network which is received at the UE(s). The command includes initiating a search for base stations at 430 by the UEs, as explained in detail supra. At 440, the UEs can then scan respective areas to identify base stations in their areas, and report back to the network.

Figure 5:
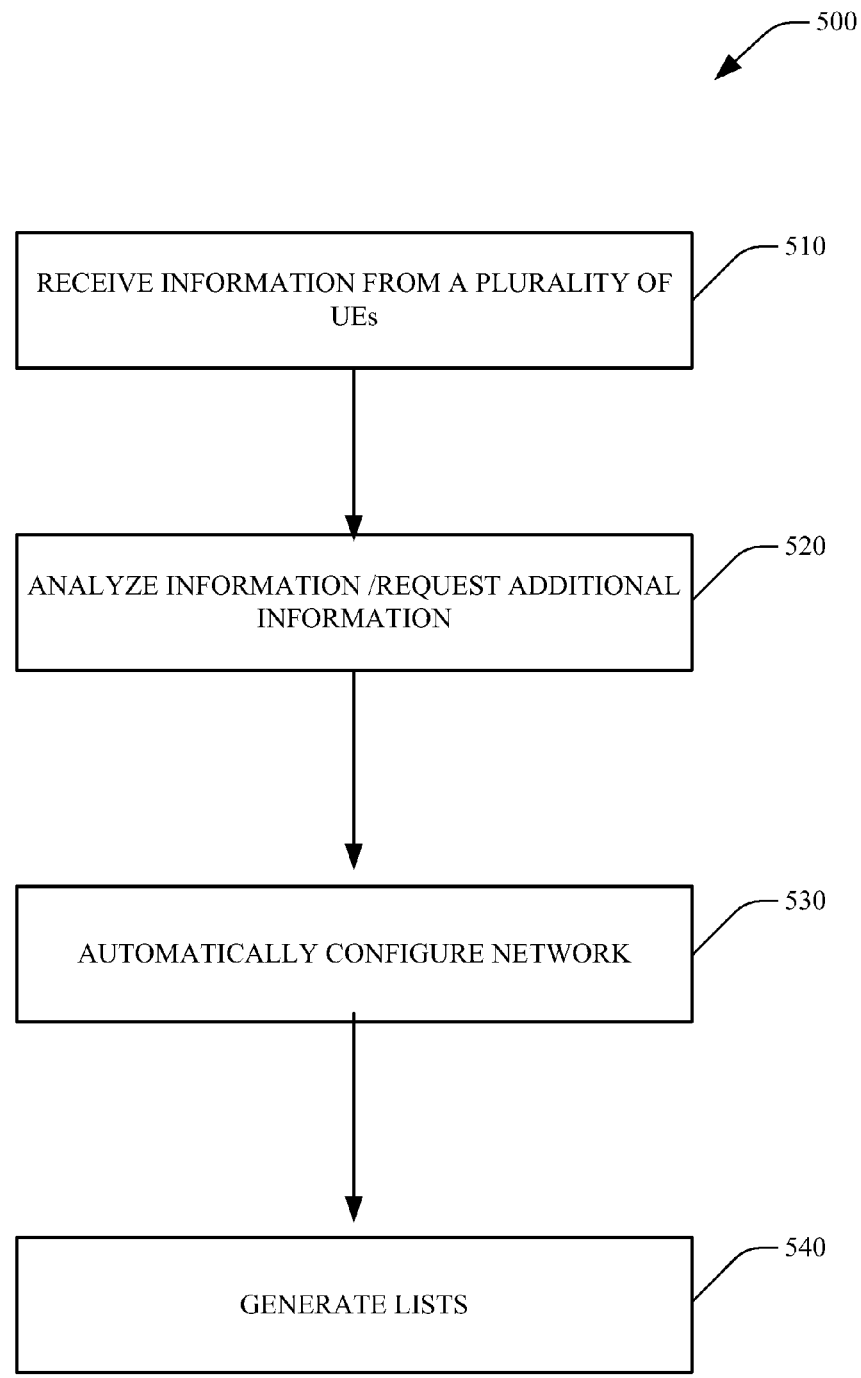
FIG. 5 is a flowchart illustrating a methodology of self configuring neighbor relations for a network according to an aspect.

FIG. 5 illustrates a related methodology 500, wherein the network can configure itself and generate lists for detected base stations, which can be part of the network or outside thereof. As such, initially and at 510 information collected by the UEs can be received by the network. Such can then be analyzed by the network at 520 and allows the network to construct a depiction of available base stations (e.g., associated with the network and/or foreign thereto). Moreover, based thereon the network can require collection of further details about base stations thus identified, and proceed to automatically configure itself at 530. Hence, a requirement for manual configuration of neighbor relations for the network can be mitigated (e.g., network installers determining available neighboring cell). Moreover, at 540 the network can compile lists (e.g., whitelists that identify base stations associated with the network; and/or black lists that indicate base stations associated with foreign networks) and inform the UEs accordingly and regarding potential possibilities of available base stations.

Figure 6:
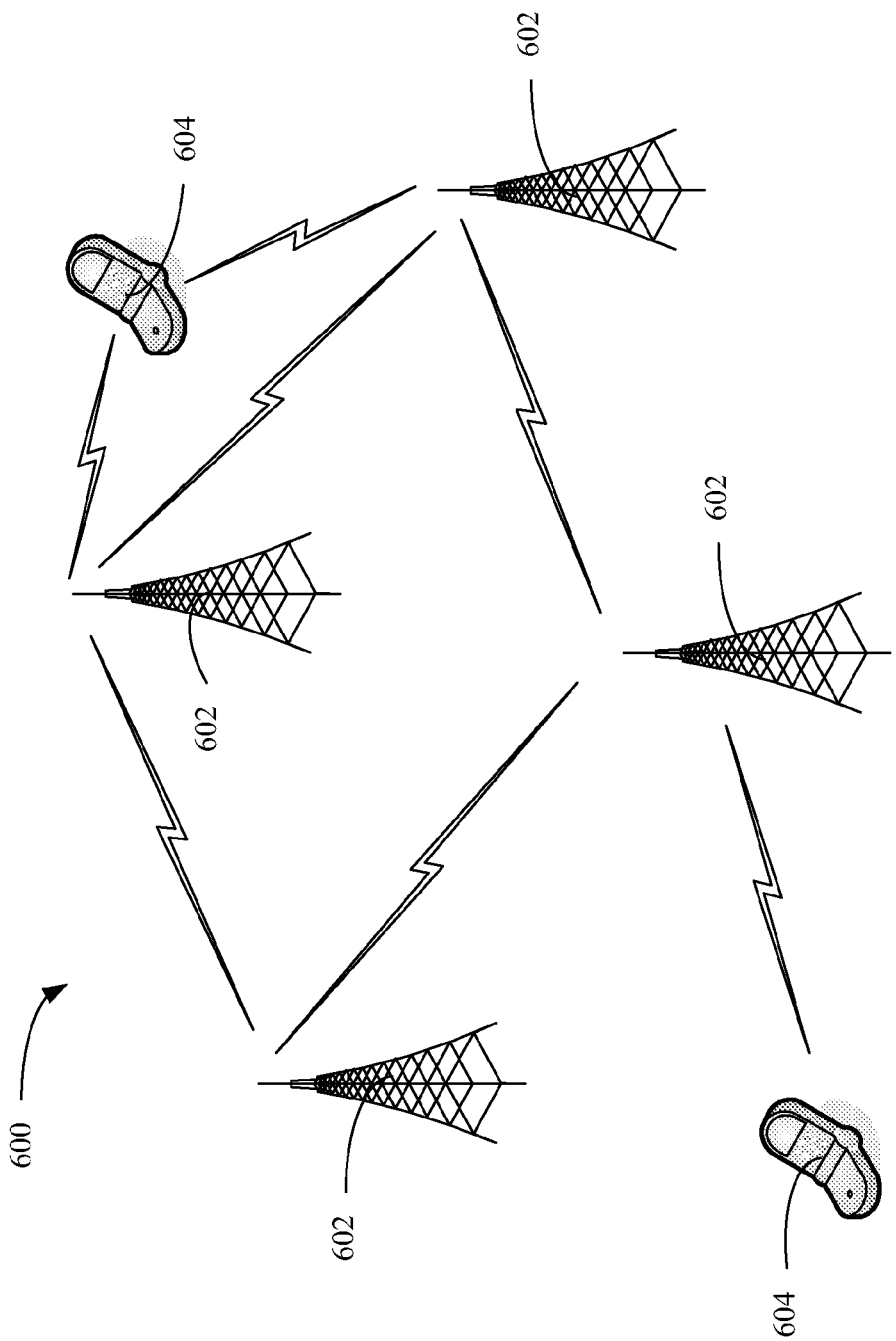
FIG. 6 is a diagram illustrating wireless communications according to an aspect.

FIG. 6 illustrates a wireless communication system 600 in accordance with various aspects presented herein. System 600 can comprise one or more base stations 602 in one or more sectors that receive, transmit, repeat, and so forth, wireless communication signals to each other and/or to one or more mobile devices 604. Each base station 602 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 604 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, an so on), as will be appreciated by one skilled in the art. During a handover from a base station to another base station, a UE 604 (or mobile device) reports, as an example, the measurement of source eNode B and signal strength to a source node. If the source eNode B determines that a handover is appropriate, a handover request is sent from the source eNode B to the target eNode B.

As described in the foregoing, embodiments of the present invention can enable a network to automatically configure its neighbor relations by commanding each user equipment (UE) to scan its respective area for base stations on a predetermined frequency. The information obtained from a plurality of user equipment can allow the network to construct a depiction of available base stations (e.g., associated with the network and/or foreign thereto). Based on the depiction, the network can require collection of further details about base stations thus identified.

Figure 7:
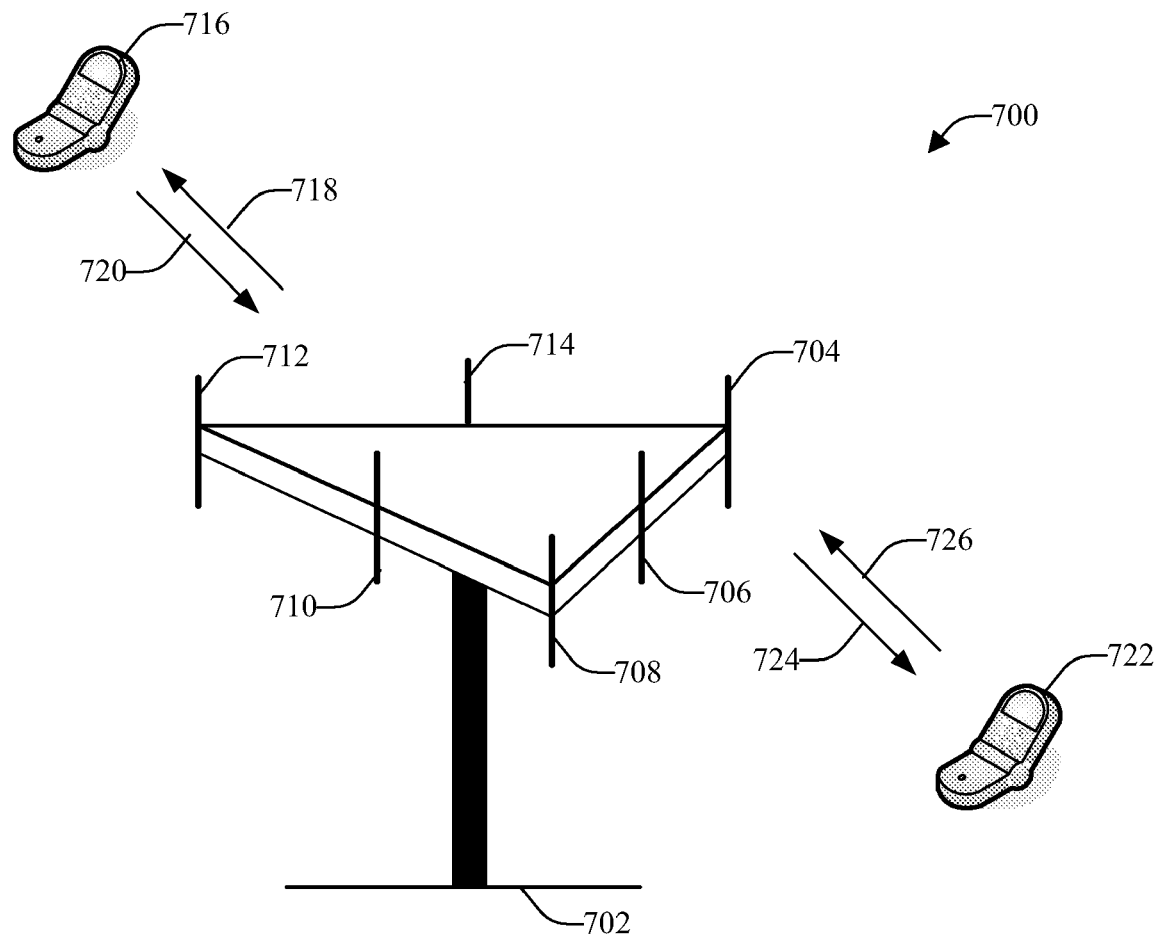
FIG. 7 is a diagram illustrating wireless communication according to an aspect.

FIG. 7 illustrates a multiple access wireless communication system 700 according to one or more aspects. A wireless communication system 700 can include one or more base stations in contact with one or more user devices. Each base station provides coverage for a plurality of sectors. As illustrated, a three-sector base station 702 includes multiple antenna groups, one including antennas 704 and 706, another including antennas 708 and 710, and a third including antennas 712 and 714. Here, only two antennas are shown for each antenna group, though more or fewer antennas can be utilized for each antenna group. Mobile device 716 is in communication with antennas 712 and 714, where antennas 712 and 714 transmit information to mobile device 716 over forward link 718 and receive information from mobile device 716 over reverse link 720. Forward link (or downlink) refers to the communication link from the base stations to mobile devices, and the reverse link (or uplink) refers to the communication link from mobile devices to the base stations. Mobile device 722 is in communication with antennas 704 and 706, where antennas 704 and 706 transmit information to mobile device 722 over forward link 724 and receive information from mobile device 722 over reverse link 726. In a FDD system, for example, communication links might utilize different frequencies for communication. For example, forward link 718 might use a different frequency than the frequency utilized by reverse link 720.

Each group of antennas and/or the area in which they are designated to communicate may be referred to as a sector of base station 702. In one or more aspects, antenna groups each are designed to communicate to mobile devices in a sector or the areas covered by base station 702. A base station may be a fixed station used for communicating with the terminals.

In communication over forward links 718 and 724, the transmitting antennas of base station 702 can utilize beamforming in order to improve a signal-to-noise ratio of forward links for the different mobile devices 716 and 722. Also, a base station utilizing beamforming to transmit to mobile devices scattered randomly through its coverage area might cause less interference to mobile devices in neighboring cells than the interference that can be caused by a base station.

Figure 8:
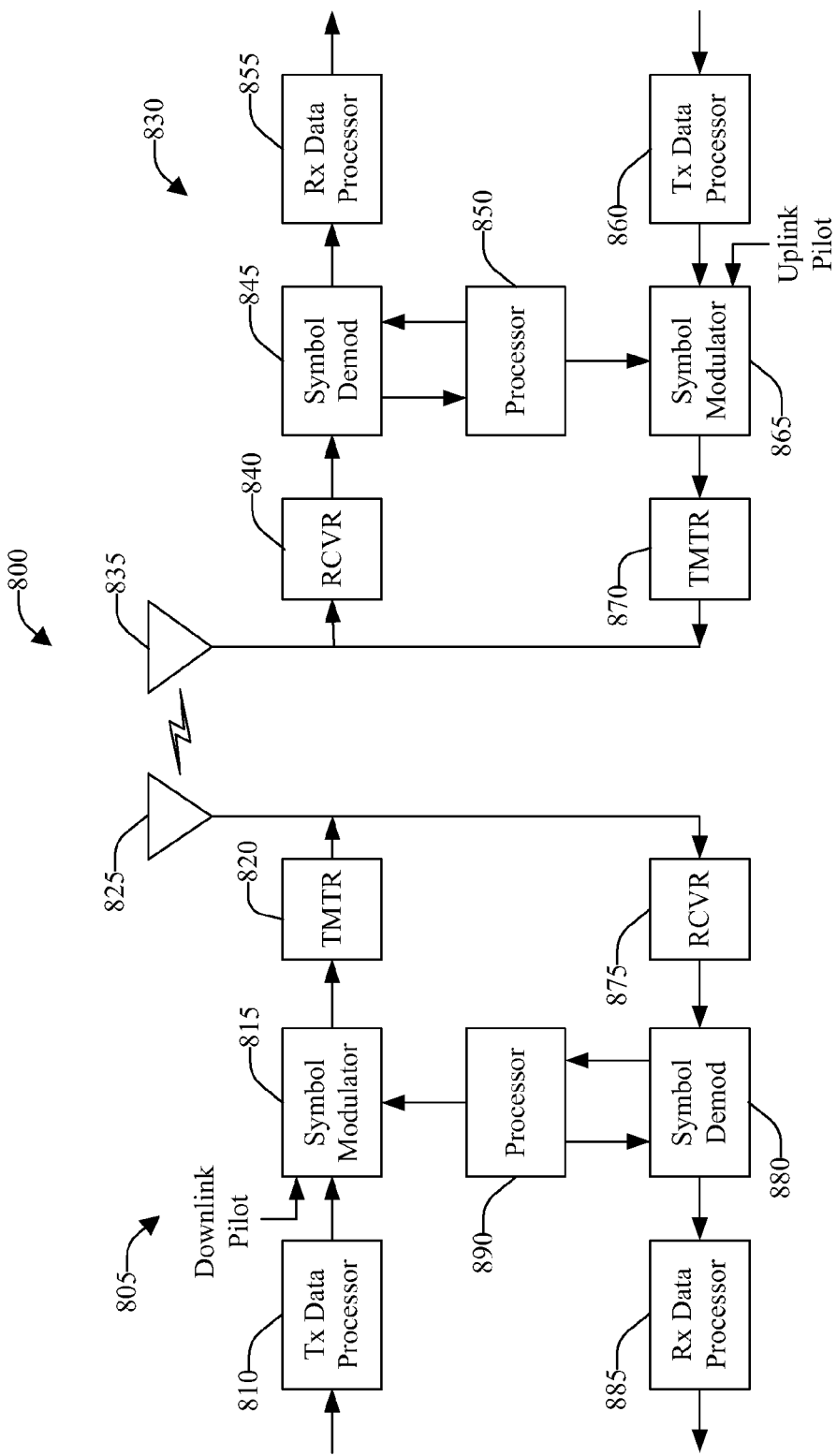
FIG. 8 is a block diagram illustrating a multiple access wireless communication system according to one or more aspects.

FIG. 8 illustrates an example wireless communication system 800. Wireless communication system 800 depicts one base station and one terminal for sake of brevity. However, it is to be appreciated that system 800 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

As illustrated in FIG. 8, on a downlink, at access point 805, a transmit (TX) data processor 810 receives, formats, codes, interleaves, and modulates (or symbol maps) traffic data and provides modulation symbols ("data symbols"). A symbol modulator 815 receives and processes the data symbols and pilot symbols and provides a stream of symbols. A symbol modulator 815 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 820 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 825 to the terminals. At terminal 830, an antenna 835 receives the downlink signal and provides a received signal to a receiver unit (RCVR) 840. Receiver unit 840 conditions (e.g., filters, amplifies, and frequency downconverts) the received signal and digitizes the conditioned signal to obtain samples. A symbol demodulator 845 obtains N received symbols and provides received pilot symbols to a processor 850 for channel estimation. Symbol demodulator 845 further receives a frequency response estimate for the downlink from processor 850, performs data demodulation on the received data symbols to obtain data symbol estimates (which are estimates of the transmitted data symbols), and provides the data symbol estimates to an RX data processor 855, which demodulates (i.e., symbol demaps), deinterleaves, and decodes the data symbol estimates to recover the transmitted traffic data. The processing by symbol demodulator 845 and RX data processor 855 is complementary to the processing by symbol modulator 815 and TX data processor 810, respectively, at access point 805.

On the uplink, a TX data processor 860 processes traffic data and provides data symbols. A symbol modulator 865 receives and multiplexes the data symbols with pilot symbols, performs modulation, and provides a stream of symbols. A transmitter unit 870 then receives and processes the stream of symbols to generate an uplink signal, which is transmitted by the antenna 835 to the access point 805.

At access point 805, the uplink signal from terminal 830 is received by the antenna 825 and processed by a receiver unit 875 to obtain samples. A symbol demodulator 880 then processes the samples and provides received pilot symbols and data symbol estimates for the uplink. An RX data processor 885 processes the data symbol estimates to recover the traffic data transmitted by terminal 830. A processor 890 performs channel estimation for each active terminal transmitting on the uplink.

Processors 890 and 850 direct (e.g., control, coordinate, manage, . . . ) operation at access point 805 and terminal 830, respectively. Respective processors 890 and 850 can be associated with memory units (not shown) that store program codes and data. Processors 890 and 850 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 890 and 850.

Figure 9:
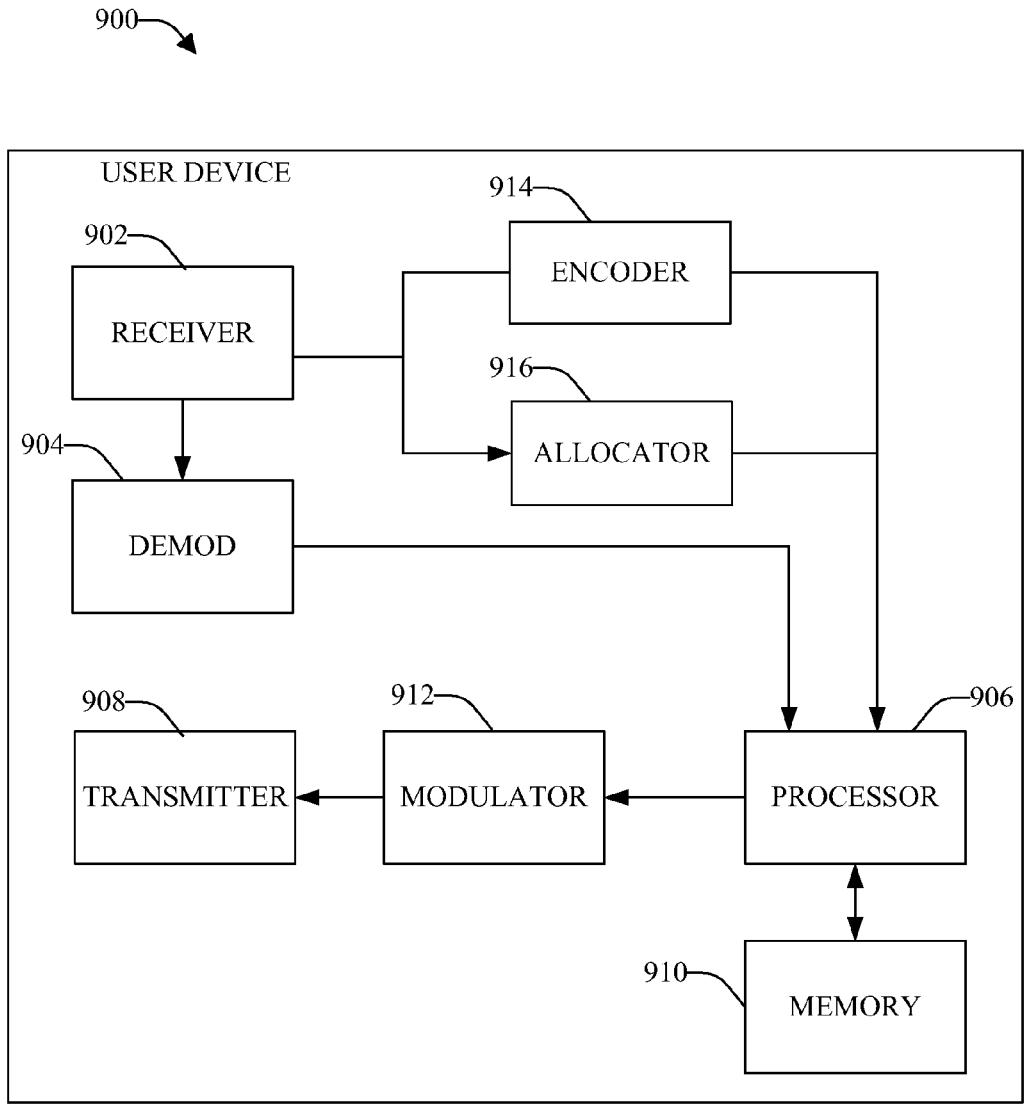
FIG. 9 is a block diagram illustrating a communication system that for each UE can scan a respective area(s) for identifiable base stations.

Illustrated in FIG. 9 is a block diagram of an example user device 900 that can scan respective areas for base stations on a predetermined frequency. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be dedicated to analyzing information received by receiver 902 and/or generating information for transmission by a transmitter 908. In addition or alternatively, processor 906 can control one or more modules of user device 900, analyze information received by receiver 902, generate information for transmission by transmitter 908, and/or control one or more modules of user device 900. Processor 906 can include a controller component capable of coordinating communications with additional user devices.

User device 900 can include memory 908 operatively coupled to processor 906 and that can store information related to coordinating communications and any other suitable information. Memory 910 can additionally store protocols associated with sample rearrangement. It will be appreciated that the data store (e.g., memories) modules described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can further comprise a symbol modulator 912 to generate a modulated signal, and a transmitter 908 that can transmit the modulated signal.

Receiver 902 is further operatively coupled to an encoder 914 that scrambles a Walsh Sequence with a random sequence to produce a scrambled sequence. The encoder 914 can be provided with the random sequence so that a single FHT can be utilized to decode the sequence. Additionally, receiver 902 can be operatively coupled to an allocator 916 that receives an assignment of one or more sub-sequences of the scrambled sequence. The transmitter 908 can send the scrambled sequence as an access-based handoff probe. In response to the access probe, receiver 902 can receive an access grant, which can be transmitted over a shared signaling MAC protocol.

Figure 10:
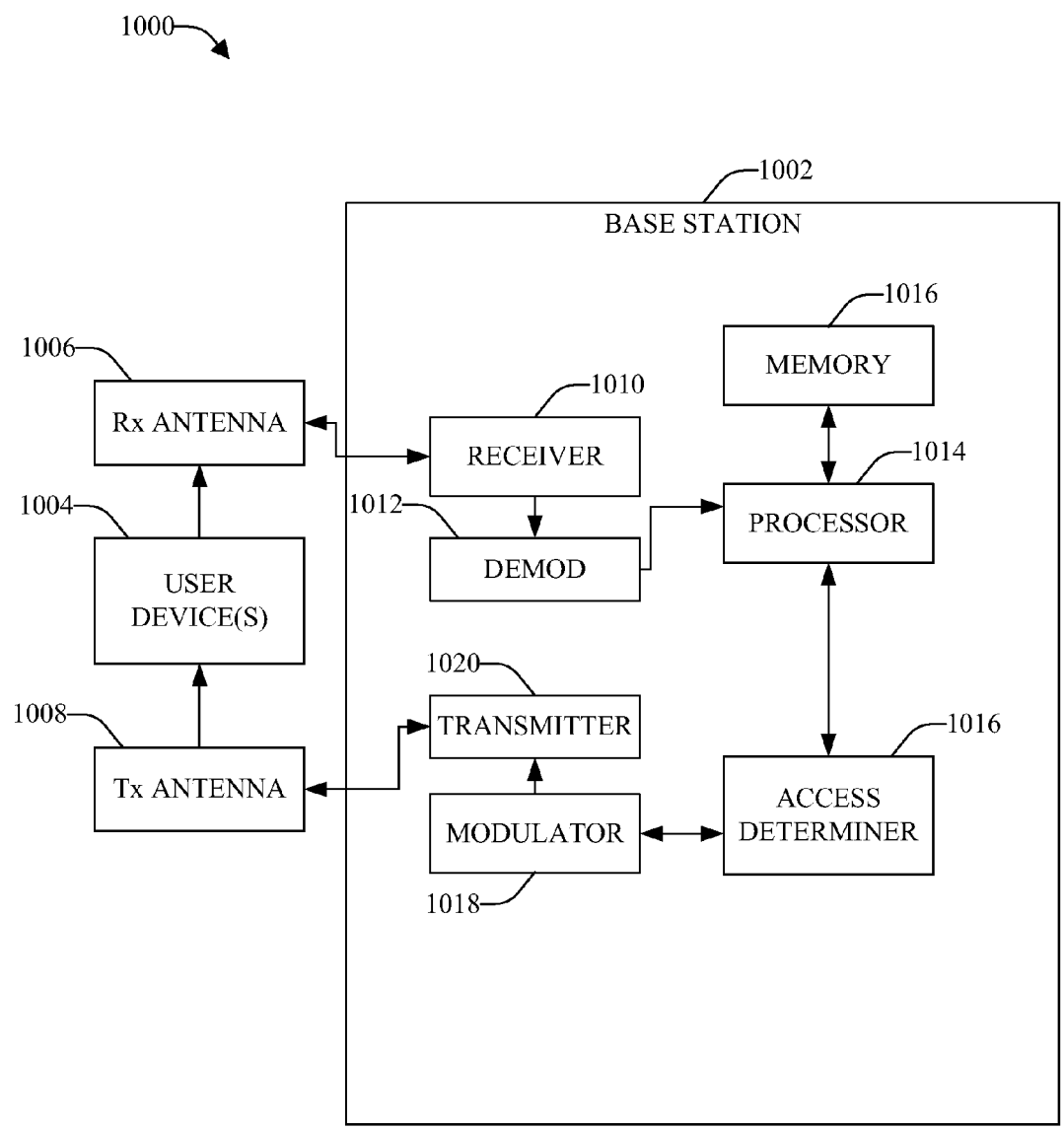
FIG. 10 is a block diagram illustrating a communication system that facilitates self configuration of neighbor relations in a network according to an aspect.

FIG. 10 is a block diagram illustrating an example system 1000 that facilitates self configuration of neighbor relations for a network in accordance with an aspect. As illustrated, base station 1002 receives signal(s) from one or more user devices 1004 by a receive antenna 1006, and transmits to the one or more user devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to broadcast-multicast waveforms embedded in a unicast waveform. A modulator 1018 can multiplex the signal for transmission by a transmitter 1020 through transmit antenna 1008 to user devices 1004.

Processor 1014 is further coupled to an access determiner 1016. Receiver 1010 can receive an access probe from one or more mobile devices that desire to gain access to a sector served by base station 1002. Demodulator 1012 can demodulate a Walsh Sequence included in the access probe utilizing an FHT. Access determiner 1016 can selectively grant the one or more mobile devices access to the sector.

In an aspect, logical channels are classified into control channels and traffic channels. Logical control channels comprises broadcast control channel (BCCH) which is a DL channel for broadcasting system control information. Paging control channel (PCCH) which is a DL channel that transfers paging information. Multicast control channel (MCCH) which is a point-to-multipoint DL channel used for transmitting multimedia broadcast and multicast service (MBMS) scheduling and control information for one or several MTCHs. Generally, after establishing RRC connection this channel is only used by UEs that receive MBMS (i.e., old MCCH+MSCH). Dedicated control channel (DCCH) is point-to-point bi-directional channel that transmits dedicated control information and used by UEs having an RRC connection. In one aspect, logical traffic channels includes a dedicated traffic channel (DTCH) that is point-to-point bi-directional channel, dedicated to one UE, for the transfer of user information. Also, one can employ a multicast traffic channel (MTCH) for point-to-multipoint DL channel for transmitting traffic data.

In another aspect, transport channels are classified into DL and UL. DL transport channels comprise a broadcast channel (BCH), a downlink shared data channel (DL-SDCH), and a paging channel (PCH), the PCH for support of UE power saving (DRX cycle is indicated by the network to the UE), broadcasted over an entire cell and mapped to PHY resources which can be used for other control/traffic channels. The UL transport channels comprise a random access channel (RACH), a request channel (REQCH), an uplink shared data channel (UL-SDCH) and a plurality of PHY channels. The PHY channels comprise a set of DL channels and UL channels.

The DL PHY Channels Comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels Comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

Figure 11:
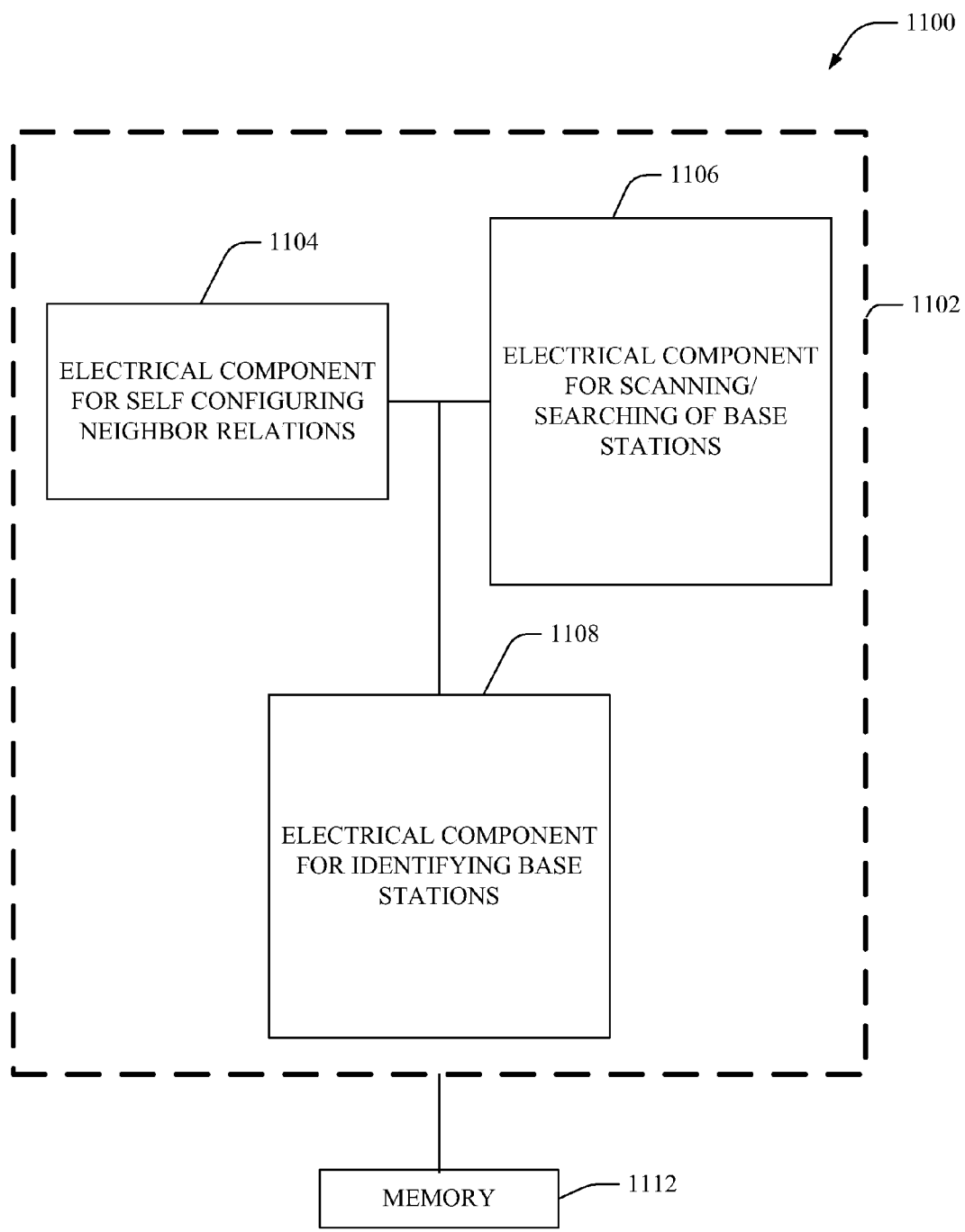
FIG. 11 is a block diagram illustrating an example system to enable a network to self configure neighbor relations in accordance with an aspect.

FIG. 11 is a block diagram of an example system 1100 that enables a framework to self configure a network in accordance with an embodiment of the present invention. Such a framework enables a UE to scan for base stations and configure a network (e.g., automatically) based on the results of the scan. The system 1100 can be associated with a communication system and includes a grouping 1102 of modules that can communicate with one another in connection with scanning for base stations and self configuring a network. Grouping 1102 also includes an electrical component 1106 for scanning/searching of base stations. In addition, electrical component 1104 enables the network to self configure neighbor relations based on identified base stations. Similarly, electrical component 1108 can facilitate identifying the base stations that have been detected as a result of the scanning/searching, as described in detail supra.

For the purposes of the present document, the following abbreviations apply:
C- Control-
CCH Control CHannel
DCCH Dedicated Control CHannel
DCH Dedicated CHannel
DL DownLink
DSCH Downlink Shared CHannel
DTCH Dedicated Traffic CHannel
FDD Frequency Division Duplex
LI Length Indicator
MAC Medium Access Control
MBMS Multmedia Broadcast Multicast Service
MCCH MBMS point-to-multipoint Control CHannel
MSCH MBMS point-to-multipoint Scheduling Channel; MBMS control channel
MTCH MBMS point-to-multipoint Traffic CHannel
PCCH Paging Control CHannel
PCH Paging CHannel
PHY PHYsical layer
RACH Random Access CHannel
RRC Radio Resource Control
TCH Traffic CHannel
TDD Time Division Duplex
U- User-
UE User Equipment
UL UpLink
UMTS Universal Mobile Telecommunications System
UTRA UMTS Terrestrial Radio Access What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of self configuring neighbor relations of a network comprising:

commanding one or more user equipments (UEs) to scan for neighbor base stations;
receiving data identifying the neighbor base stations from the one or more UEs;
analyzing the data identifying the neighbor base stations;
collecting additional information, from the one or more UEs, for one or more of the neighbor base stations based on said analysis; and
self configuring neighbor relations based on received data and collected additional information.

2. The method of claim 1, wherein said self configuring is performed automatically.

3. The method of claim 1, further comprising compiling at least one of black lists, white lists, and a combination thereof for the one or more UEs, to facilitate accessing base stations.

4. The method of claim 1 further comprising commanding the one or more UEs based on a predetermined triggering event.

5. The method of claim 1, further comprising scanning for a base station on a predetermined frequency.

6. The method of claim 1, further comprising scanning for a base station on a predetermined radio access technology.

7. A wireless communications apparatus, comprising:
at least one processor configured to:
instruct one or more user equipments (UEs) to scan for base stations;
receive data identifying the base stations from the one or more UEs;
analyze the data identifying the neighbor base stations;
collect additional information, from the one or more UEs, for one or more of the neighbor base stations based on said analysis; and
self configure neighbor relations associated with the base stations based on received data and collected additional information.

8. The wireless communication apparatus of claim 7, wherein the at least one processor is further configured to generate accessibility lists to facilitate accessing the base stations.

9. The wireless communication apparatus of claim 8, wherein the at least one processor is further configured to automatically self configure neighbor relations.

10. The wireless communication apparatus of claim 7, wherein the at least one processor is further configured to scan based on a predetermined radio access technology.

11. A wireless communication apparatus for self configuring a network, comprising:
means for commanding one or more user equipments (UEs) to search for base stations;
means for receiving data identifying the neighbor base stations from the one or more UEs;
means for analyzing the data identifying the neighbor base stations;
means for collecting additional information, from the one or more UEs, for one or more of the neighbor base stations based on said analysis; and
means for self configuring neighbor relations in a network based on received data and collected additional information.

12. The wireless communication apparatus of claim 11, further comprising means for compiling lists based on the discovered base stations.

13. A computer program product comprising:
a non-transitory computer-readable medium including code for causing at least one computer to:
command one or more user equipments (UEs) associated with a network to scan for base stations;
receive data identifying the neighbor base stations from the one or more UEs;
analyze the data identifying the neighbor base stations;
collect additional information, from the one or more UEs, for one or more of the neighbor base stations based on said analysis; and
automatically configure neighbor relations for the network based on received data and collected additional information.

14. The computer program product of claim 13, wherein the code causes the at least one computer to generate at least one of black lists, white lists, and a combination thereof for one or more UEs, to facilitate accessing the base stations.

15. The computer program product of claim 13, wherein the code causes the at least one computer to scan based on a predetermined radio technology.

16. A method of self configuring neighbor relation of a network comprising;
scanning an area to identify base stations, in response to a command received from a serving base station;
identifying the base stations by measurement reports;
transmitting information regarding the base stations to the serving base station;
receiving a request for additional information about one or more of the identified neighbor base stations; and
transmitting the additional information to the serving base station for a neighbor relation configuration thereof.

17. The method of claim 16, further comprising initiating said scanning based on predetermined triggering events.

18. The method of claim 17, wherein the triggering events include an addition of a base station to a network.

19. The method of claim 16, wherein said scanning is based on a predetermined frequency.

20. The method of claim 16, wherein said scanning is based on a predetermined radio access technology.

21. A wireless communications apparatus, comprising:
at least one processor configured to:
search an area for neighbor base stations, in response to a command received from a serving base station;
identify the base stations by measurement reports;
transmit information regarding the base stations to the serving base station;
receive a request for additional information about one or more of the identified neighbor base stations; and
transmit the additional information to the serving base station for a neighbor relation configuration thereof.

22. The wireless communications apparatus of claim 21, wherein the at least one processor is configured to initiate identification of the neighbor base stations based on predetermined triggering events.

23. The wireless communications apparatus of claim 21, wherein the at least one processor is configured to scan based on a predetermined frequency.

24. The wireless communications apparatus of claim 21, wherein the at least one processor is configured to verify whether a triggering event has occurred.

25. The wireless communications apparatus of claim 21, wherein the at least one processor is configured to receive a command by a network to initiate the search.

26. A computer program product comprising:
a non-transitory computer-readable medium including code for causing at least one computer to:
search an area to identify neighbor base stations, in response to a command received from a serving base station;

identify the neighbor base stations by measurement reports; transmit information regarding the neighbor base stations to the serving base station;

receive a request for additional information about one or more of the identified neighbor base stations; and transmit the additional information to the serving base station for a neighbor relation configuration thereof.

27. The computer program product of claim 26, wherein the computer program further comprises code for initiating said searching based on predetermined triggering events.

28. The computer program product of claim 26, wherein the computer program further comprises code for scanning based on a predetermined frequency and radio access technology.

29. The computer program product of claim 26, wherein the neighbor relation configuration is performed automatically.

30. A wireless communication apparatus for self configuring neighbor relations of a network comprising:

means for searching an area to identify neighbor base stations, in response to a command received from a serving base station;

means for transmitting information regarding neighbor base stations identified by the searching to the serving base station means for receiving a request for additional information about one or more of the identified neighbor base stations; and means for transmitting the additional information to the serving base station for configuring a neighbor relation of the network according to the transmitted information regarding the neighbor base stations and the additional information.

31. The wireless communication apparatus of claim 30, further comprising means for compiling lists based on identified neighbor base stations.

* * * * *